UNITED STATES PATENT OFFICE.

RENÉ BOHN, OF MANNHEIM, GERMANY, ASSIGNOR TO BADISCHE ANILIN & SODA FABRIK, OF LUDWIGSHAFEN-ON-THE RHINE, GERMANY, A CORPORATION.

ANTHRACENE DYE AND PROCESS OF MAKING SAME.

No. 868,399.      Specification of Letters Patent.      Patented Oct. 15, 1907.

Application filed June 18, 1907. Serial No. 379,660.

*To all whom it may concern:*

Be it known that I, RENÉ BOHN, doctor of philosophy and chemist, a citizen of the Swiss Republic, residing at Mannheim, Germany, have invented new and useful Improvements in Anthracene Dyes and Processes of Making the Same, of which the following is a specification.

My invention relates to the production of new coloring matters of the anthracene series. I have discovered that by treating hydroxyanthraquinones, or derivatives thereof, with formaldehyde and with a salt of sulfurous acid in the presence of alkali, new compounds can be obtained which are easily soluble in water and so differ from the hydroxyanthraquinones. The new compounds can be used as coloring matters, or as materials for the production of other compounds.

The following table gives the properties of some of the new coloring matters obtainable according to my invention.

| Coloring matter from— | Water. | Solution in— | | | Shade on chrome-mordanted fiber. |
|---|---|---|---|---|---|
| | | Dilute caustic soda. | Conc. sulfuric acid. | Dilute sulfuric acid. | |
| Anthracene blue WR | Bluish red | Blue | Violet | Red | Blue. |
| Cyclamin | Red | Blue | Violet | Red | Blue. |
| Pentacyanin R | Dark red | Blue | Red-violet | Red | Blue. |
| 1.2.3.5.7-pentaoxy-anthraquinone | Orange | Brown | Orange-red | Orange | Brown. |
| Anthrachryson | Yellow-brown | Red-brown | Brown | Yellow-green | Red-brown. |
| Alizarinbordeaux | Brown-red | Violet-blue | Red-violet | Brown-red | Violet-blue. |

The following is an example of how my invention can be performed, but it is not confined to this example. The parts are by weight.

To one hundred (100) parts of a ten (10) per cent. paste of the hexahydroxyanthraquinone known in commerce as anthracene blue WR extra, add while stirring well, one hundred (100) parts of a thirty (30) per cent. sodium sulfite solution and sixty (60) parts of a twenty-four per cent. caustic soda solution. Then allow from five (5) to six (6) parts of a thirty (30) per cent. formaldehyde solution to flow into the mixture, and heat for from three (3) to five (5) hours at a temperature of from ninety (90) to one hundred (100) degrees centigrade. When the mixture is cool, acidify it by means of about one hundred and fifteen (115) parts of thirty (30) per cent. hydrochloric acid, and finish precipitating the product by means of common salt. Filter, and wash with a solution of common salt. In this example, the quantity of sulfite and of alkali employed can be considerably varied.

The compound, or coloring matter, obtained as aforesaid, consists of a dark brown powder which is easily soluble in water yielding a bluish red solution, and it can be precipitated from the solution by the addition of common salt, or of sodium sulfate. It yields a blue solution in dilute caustic soda solution, a violet solution in concentrated sulfuric acid, and a red solution in dilute sulfuric acid. It is very slightly soluble in hot glacial acetic acid. It is especially suitable for printing on cotton in combination with a metallic mordant, yielding brilliant printing effects which are of excellent fastness.

In a similar manner, other hydroxyanthraquinones can be treated with formaldehyde and a sulfite in the presence of alkali, such for instance as hexacyanin (hexahydroxyanthraquinone), alizarincyanin R (pentahydroxyanthraquinone), and Alizarin Bordeaux (tetrahydroxyanthraquinone).

Now what I claim is:

1. The process of producing coloring matters of the anthracene series by treating a hydroxyanthraquinone body with formaldehyde and with a salt of sulfurous acid in the presence of alkali.

2. The process of producing coloring matters of the anthracene series by treating hexahydroxyanthraquinone with formaldehyde and with a salt of sulfurous acid in the presence of alkali.

3. As new articles of manufacture the coloring matters which can be obtained by treating a hydroxyanthraquinone body with formaldehyde and with a salt of sulfurous acid in the presence of alkali, which coloring matters yield bluish red to yellowish brown solutions in water, violet-blue to red-brown solutions in dilute caustic soda, orange-red to violet solutions in concentrated sulfuric acid, red to yellowish green solutions in dilute sulfuric acid and which dye cotton mordanted with chromium compounds yielding from violet-blue to red-brown shades.

4. As a new article of manufacture the coloring matter obtainable by treating hexahydroxyanthraquinone with formaldehyde and with a salt of sulfurous acid in the presence of alkali, which coloring matter yields bluish red solutions in water, blue solutions in dilute caustic soda, violet solutions in concentrated sulfuric acid and red solutions in dilute sulfuric acid, and which dye cotton mordanted with chromium compounds yielding blue shades.

In testimony whereof I have hereunto set my hand in the presence of two subscribing witnesses.

RENÉ BOHN.

Witnesses:
J. ALEC. LLOYD,
ERNEST F. EHRHARDT.